United States Patent [19]

Wolff

[11] 4,348,787

[45] Sep. 14, 1982

[54] APPARATUS FOR TREATING MEAT PRODUCTS PRIOR TO PACKAGING

[76] Inventor: Guenter G. Wolff, R.D. 2, Box 441, Leesburg Rd., New Wilmington, Pa. 16142

[21] Appl. No.: 943,426

[22] Filed: Sep. 18, 1978

[51] Int. Cl.³ ............................................. A22C 9/00
[52] U.S. Cl. ...................................... 17/27; 100/153
[58] Field of Search ............................ 17/27, 1 G, 26; 100/153

[56] References Cited

U.S. PATENT DOCUMENTS

| 130,844 | 8/1872 | Cook | 17/27 |
|---|---|---|---|
| 168,602 | 10/1875 | Billington | 17/26 |
| 386,226 | 7/1888 | Welch | 17/26 |
| 470,258 | 3/1892 | Purdy | 17/26 |
| 2,279,071 | 4/1942 | Spang | 17/27 X |
| 3,644,125 | 2/1972 | Lobiondo et al. | 17/1 G X |
| 3,671,999 | 6/1972 | Downs | 17/1 G |
| 3,893,384 | 7/1975 | Lo Biondo et al. | 17/27 UX |
| 4,085,482 | 4/1978 | Charron | 17/26 |
| 4,133,075 | 1/1979 | Collins | 17/27 X |

Primary Examiner—Willie G. Abercrombie
Attorney, Agent, or Firm—Gilbert L. Wells

[57] ABSTRACT

This apparatus is used to compress previously treated meat products prior to packaging. The compression is accomplished by passing square or rectangular portions of meat such as hams along a continuous conveyor and compressing the portions between a pair of rollers having a plurality of blunt teeth above the conveyor and corresponding spring loaded tension plates pressing against the underside of the conveyor.

6 Claims, 3 Drawing Figures

APPARATUS FOR TREATING MEAT PRODUCTS PRIOR TO PACKAGING

BACKGROUND OF THE INVENTION

The field of the invention is apparatus for treating food and the present invention is particularly concerned with the preparation of meat products prior to packaging or canning.

The state of the art of methods and apparatus for preparing canned meat products which includes macerating the major sections may be ascertained by reference to U.S. Pat. No. 3,644,125, the disclosure of which is incorporated herein.

Tenderizing of pieces of meat by puncturing or slitting of the surfaces of the pieces of meat prior to canning is known. It is also known to puncture stacked pieces of meat and then to mold a composite assembly of the punctured pieces to a desired shape. Even when gelatin is applied to the pieces, the pieces are not firmly bonded together.

SUMMARY OF THE INVENTION

Having in mind the limitations of the prior art, it is an object of the present invention to decrease or eliminate the use of gelatin.

Another object of the present invention is to improve the distribution of cure. A further object of the present invention is to improve the color of pieces of meat. Yet another object of the invention is to make a more tender product by pressing and cutting into the muscle tissue of pieces of meat.

All of these and other objects of the present invention are achieved by an apparatus having a continuous porous conveyor, two pressure rollers having a plurality of blunt teeth above the conveyor for macerating pieces of meat transported on the conveyor and two spring loaded tension plates under the conveyor corresponding to the pressure rollers for applying pressure to the pieces of meat passing under the rollers on the conveyor.

The blunt teeth of the rollers enlarge the surface area of the pieces of meat and cause an increase in the release of myosin (soluble protein) which is the natural binder in meat.

Since the apparatus can be manually loaded without adjustments and is used in a conveyor type of high production line, it has great flexibility.

Another advantage of the apparatus is that it reduces shrinkage of pieces of meat after cooking or smoking.

BRIEF DESCRIPTION OF DRAWINGS

The apparatus may be best described by reference to the accompanying drawings, wherein.

DESCRIPTION OF THE PREFERRED EMBODIMENTS

Figure 1:
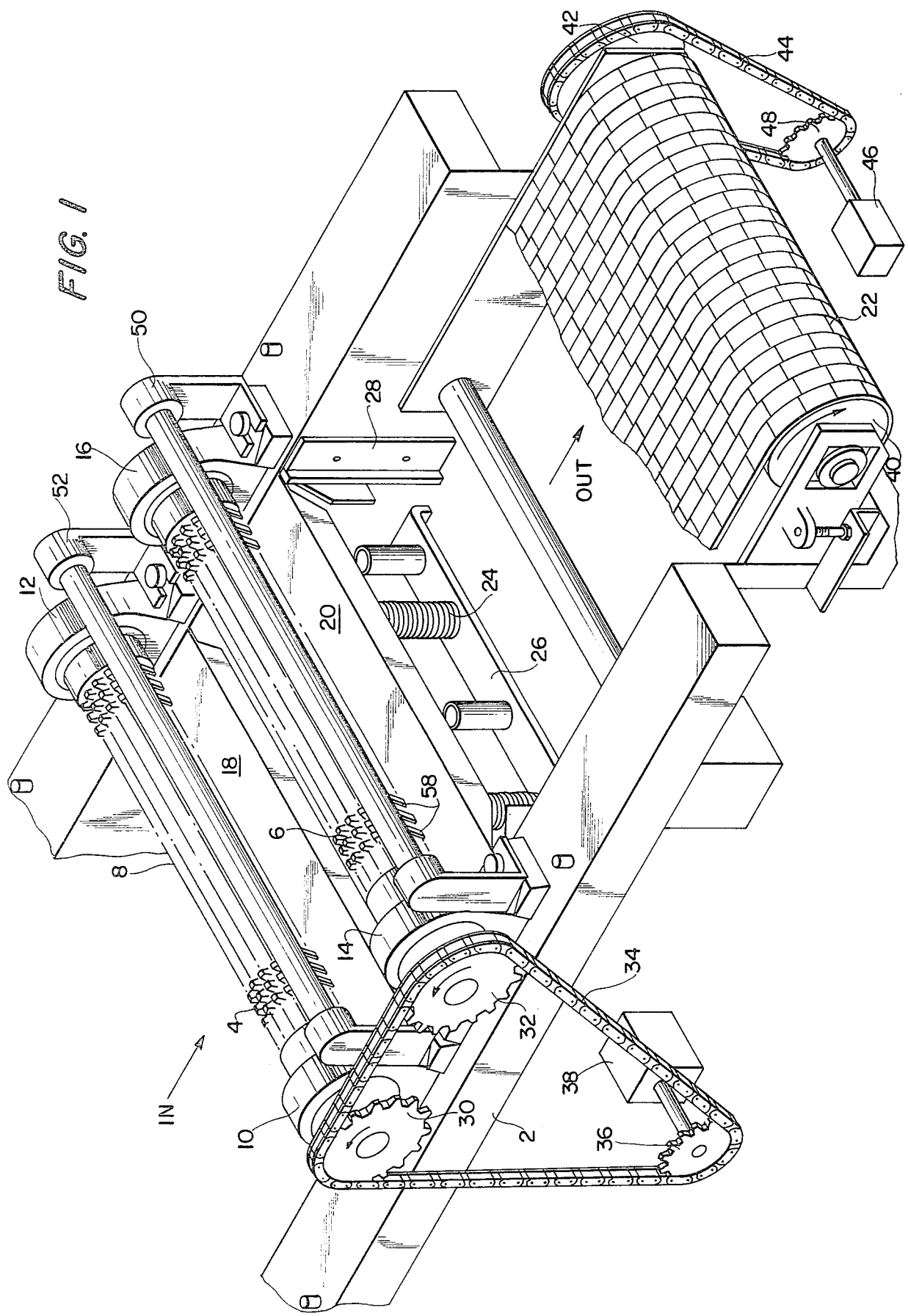
FIG. 1 is a perspective partial view of the present invention.

With particular reference to FIG. 1, a conveyor frame 2 is shown having mounted thereon rollers 4 and 6 having rows and columns of blunt teeth. Each of the rollers has a plurality of blunt teeth 8.

Roller 4 is mounted on frame 2 by journals 10 and 12 and roller 6 is mounted on the frame by journals 14 and 16. Tension plate 18 is positioned below roller 4 and tension plate 20 is positioned below roller 6. These tension plates are pressed against the underside of conveyor 22 by a plurality of springs 24 mounted on transverse plates 26 which are adjustably mounted to uprights 28 of the frame 2.

Roller 4 has a sprocket 30 at one end thereof and roller 6 has a sprocket 32 at the same end. These sprockets 30, 32 are driven by a chain 34, a motor drive sprocket 36 and an electric motor 38.

Continuous conveyor 22 is transported on conveyor roller 40 by a roller sprocket 42, chain drive 44, electric motor 46 and chain drive sprocket 48.

Mounted in back of rollers 6 and 4 are guide supports 50 and 52 having guides 54 and 56 mounted thereon. Each guide has a plurality of stainless steel fingers or projections 58.

Figure 2:
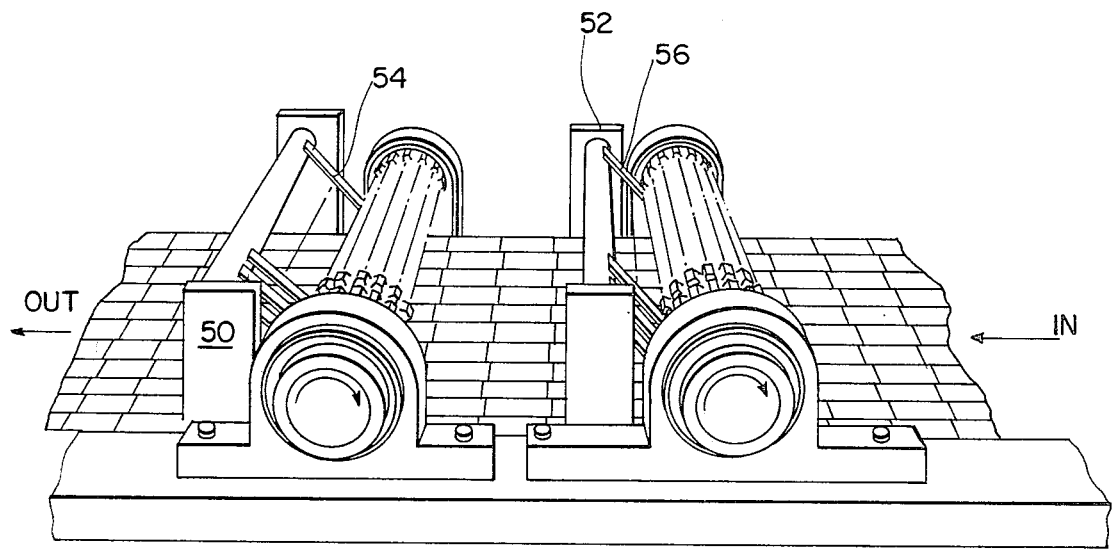
FIG. 2 is a detailed side view of the other side of the apparatus of FIG. 1.

FIG. 2 shows the rollers from the opposite side of FIG. 1 with guide supports 50 and 52 and the projections 58 of the guides engaging the surfaces of the rollers.

Figure 3:
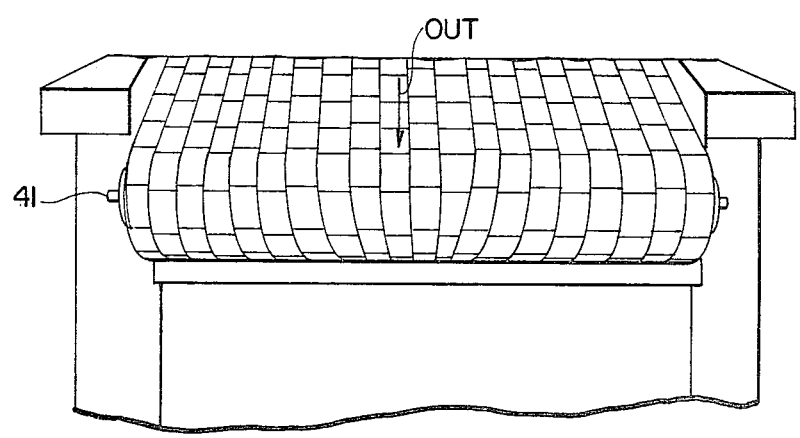
FIG. 3 is a view of the apparatus of FIG. 1 from the other end of the conveyor.

FIG. 3 shows the conveyor of FIG. 1 from the other end and additionally shows the second conveyor roller 41 with the conveyor 22 passing therearound.

BEST MODE OF CARRYING OUT THE INVENTION

Cured hams has boned out completely and cut open on one side in such a way that the top and bottom parts are still connected and about the same thickness. The hams are trimmed and placed on the machine conveyor with the fat side down. With the cut surface up, the conveyor takes the hams over the spring tension plates and under the roller assembly.

At this point blunt teeth of the rollers press holes into the meat, enlarge the surface area, cut into the muscle tissue and make the hams more flexible and easier to stuff into casings or molds. The application of the rollers also helps to develop the cure color more evenly in the different muscles.

Between pressing holes into the meat and enlarging the surface area, it also makes it possible for the myosin (soluble protein) to rise more freely to the surface.

The roll treated hams are then stuffed into casings or molds with the bottom and top parts properly positioned so that the myosin develops into a perfect natural binder.

As a result of the treatment of the present invention, the final product looks and feels like it is one solid piece.

Cooking and smoking shrinkage is greatly reduced as compared to the prior art methods and additional savings are realized by decreasing or eliminating the use of gelatin.

I claim:

1. An apparatus for treating meat products comprising:
    a conveyor frame having an input end, an output end and a midportion, a first conveyor support roller mounted for rotation at said input end, a second conveyor support roller mounted for rotation at said output end, an endless foraminous metal conveyor passing around and frictionally engaging said conveyor support rollers for transporting said meat products, and having an upper band with an upper surface and a lower surface, said upper band transported from said input end to said output end, a first roller having a plurality of blunt teeth mounted for rotation on said frame above said upper surface for beginning treatment of said meat products, and positioned short of said midportion, a second roller having a plurality of blunt teeth mounted for rotation on said frame above said upper surface and positioned beyond said midportion in a direction of said upper band transport for finishing treatment of said meat products, a first tension plate mounted on said frame below said first roller having a plurality of blunt teeth in pressing relationship with said lower surface comprising said meat products into said first roller having a plurality of blunt teeth and a second tension plate mounted on said frame below said second roller having a plurality of blunt teeth in pressing relationship with said lower surface for compressing said meat products into said second roller having a plurality of blunt teeth.

2. The apparatus of claim 1, further comprising a plurality of springs under compression applied to the undersides of said tension plates.

3. The apparatus of claim 1, further comprising first and second guides mounted on said frame behind said rollers having a plurality of blunt teeth respectively in said direction of band transport.

4. The apparatus of claim 3, further comprising first and second drive sprockets at one end of each of said rollers having a plurality of blunt teeth, a motor for driving said rollers having a plurality of blunt teeth and means for transmitting power of rotation from said motor to said rollers having a plurality of blunt teeth.

5. The apparatus of claim 4, further comprising a third drive sprocket at one end of at least one of said conveyor rollers, a second motor for driving at least one of said conveyor rollers and means for transmitting power of rotation from said second motor to at least one of said conveyor rollers.

6. The apparatus of claim 3, further comprising a plurality of steel fingers projecting from said guides and engaging said blunt teeth for removing said meat products therefrom.

* * * * *